United States Patent [19]

Keil et al.

[11] Patent Number: 5,128,440
[45] Date of Patent: Jul. 7, 1992

[54] WHOLLY AROMATIC POLYAMIDE FROM ALKYLSULFONYL AROMATIC DIAMINE

[75] Inventors: Günter Keil, Hofheim am Taunus; Reiner Hess, Wiesbaden; Jochen Rapp, Frankfurt am Main, all of Fed. Rep. of Germany

[73] Assignee: Hoechst Aktiengesellschaft, Frankfurt am Main, Fed. Rep. of Germany

[21] Appl. No.: 654,874

[22] Filed: Feb. 13, 1991

[30] Foreign Application Priority Data

Feb. 15, 1990 [DE] Fed. Rep. of Germany ....... 4004652

[51] Int. Cl.$^5$ .............................................. C08G 69/32
[52] U.S. Cl. ................................... 528/337; 528/125; 528/183; 528/184; 528/229; 528/321; 528/340; 528/348
[58] Field of Search ............... 528/337, 321, 125, 183, 528/184, 229, 340, 348

[56] References Cited

U.S. PATENT DOCUMENTS 3,409,596 11/1968 Unger et al. .................. 528/337
4,373,087 2/1983 Kaneda et al. ................ 528/337

*Primary Examiner*—Harold D. Anderson

[57] ABSTRACT

Aromatic copolyamides are described, which are soluble in organic amide solvents. The polymers are composed to at least 95 mol % of repeat structural units A: —OC—AR—CO—
B: —HN—Ar'—NH—
C: —HN—Ar"—NH—

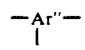

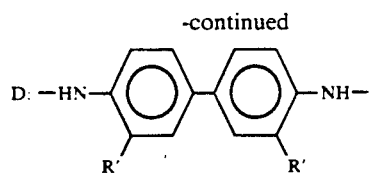

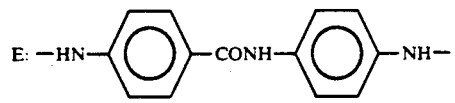

in the combinations A+B+C+D, or A+C+D+E and up to 5 mol % of m-bond-containing structural units F and/or G derived from aromatic dicarboxylic acids (F') and/or from aromatic diamines (G'), the sum total of the mole fractions of structural units A+F and the sum total of the mole fractions of the structural units of B+C+D+E+G being essentially the same, —Ar— and —Ar'— are divalent aromatic radicals whose C—N valence bonds are in a para-position or in a similar coaxial or parallel position and which may be substituted by one or two inert radicals, such as lower alkykl or halogen, —Ar"—
| is a trivalent aromatic radical which after removal of the —SO$_2$R group has the same meaning as —Ar— or —Ar'— or else is the structural unit

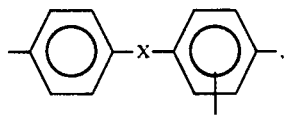

wehre X is —O—, —NHCO—, —SO$_2$— or —CO—,
—R is lower alkyl and
—R' is lower alkyl or alkoxy, and the proportions of the diamine components B, C, D and E are within the following limits:
B: 25-47.5 mol %
C: 7.5-30 mol
D: 45-67.5 mol and
E: 20-40 mol.

12 Claims, No Drawings

WHOLLY AROMATIC POLYAMIDE FROM ALKYLSULFONYL AROMATIC DIAMINE

The invention relates to novel wholly aromatic polyamides of the dicarboxylic acid/diamine type which can be spun from their solutions in organic solvents and to shaped structures produced therefrom, such as filaments, fibers, fiber pulp, films, sheets and membranes, having a very high initial modulus (modulus of elasticity), and to processes for the preparation thereof. Aromatic polyamides (polyaramides), as will be known, are raw materials of high thermal and chemical stability and of low flammability. For instance, fibers and films produced from such raw materials have very good mechanical properties, such as high strength and a high initial modulus (modulus of elasticity), and are highly suitable for industrial applications, for example for reinforcing plastics or for use as filter materials. The polymers required therefor are most advantageously prepared in a known manner by reacting aromatic diamines with aromatic dicarbonyl dichlorides in aprotic organic solvents of the amide type (N,N-dimethylacetamide, N-methylpyrrolidone, N,N,N',N'-tetramethylurea and the like), in the presence or absence of calcium or lithium halides, and neutralizing the hydrogen chloride formed, for example with calcium oxide. Polyaramides of high strength and high initial modulus are those in which the amide bonds are oriented coaxially or virtually parallel to one another, resulting in rigid, rodlike polymer molecules.

A typical polyamide of this type is for example poly(p-phenyleneterephthalamide). Filaments made of this material are described in German Patent 2,219,703. This polyamide has a number of advantages, but its preparation and processing are very difficult. Owing to the sparing solubility in polar organic solvents, even in the presence of inorganic salts such as calcium chloride or lithium chloride as solubilizers, this polymer, once formed, rapidly precipitates from the reaction medium. It must be isolated, washed, dried and then redissolved in a spinning solvent. The preferred solvent for preparing spinning solutions is concentrated sulfuric acid, which presents special problems with the handling (workplace safety, corrosion) and waste disposal. It has therefore been proposed to circumvent these difficulties by developing copolyamides which are readily soluble in the known amide solvents, which are also readily spinnable and whose filaments possess high strength values and initial moduli after drawing. For instance, DE-A-21 44 126 describes the preparation of soluble aromatic polyamides having high modulus of elasticity whereby substituted 3-(p-aminophenoxy)-4-aminobenzanilides combined with terephthaloyl chloride give readily soluble polyamides which can be spun and drawn to give filaments of high strengths and initial moduli. The increased solubility is due to the meta-orientation and the oxygen bridge atom. German Patent 2,556,883 and German Offenlegungsschrift 3,007,063 describe copolyamides of terephthalic acid, p-O phenylenediamine and 3,4'-diaminodiphenyl ether, which in amide solvents form isotropic solutions which are readily spinnable. Drawing to a very high draw ratio confers high strengths and medium moduli on the filaments The disadvantage of the two aforementioned processes is that the asymmetrical diamines required are very expensive to prepare and purify. For this reason, German Offenlegungsschriften DOS 3,510,655 and DOS 3,605,394, EP-A-0 199 090 and U.S. Pat. No. 4,847,354 describe terephthalamides which contain 3 diamine components in specific, defined proportions and which are readily soluble in amide solvents and can be shaped into filaments or films having very good strengths and moduli.

Owing to the presence of non-aromatic chain constituents, such as —O— or —CH$_2$—groups, the moduli described in the just cited references are still not sufficiently high for certain applications. Filaments formed from the abovementioned poly(p-phenyleneterephthalamide) described in German Patent 2,219,703 attain moduli of up to 99 N/tex only after a costly thermal aftertreatment (cf. also U.S. Pat. No. 3,767,756 column 11 and DE Patent 2,219,703 page 14).

For this reason it has also already been proposed to prepare terephthalamides from mixtures of three aromatic diamines without non-aromatic chain constituents in order to obtain filaments having high strengths and very high moduli (German Patent Applications P 38 35 405, P 38 35 419 and P 38 35 441).

The disadvantage with these products is that they are not very readily soluble in amide solvents, so that solutions become inhomogeneous when slightly chilled, for example due to cold equipment, because of the drop below the solubility limit. Also, if the solubility is to be improved, this usually requires an amount of salt in addition to that formed in the neutralization, necessitating thorough washing of the filaments.

It is an object of the present invention to make available aromatic copolyamides which through the use of amide solvents can be converted into shaped structures which shall then exhibit a number of physical properties. If filaments and fibers are to be produced, high strengths and very high initial moduli in particular should be attainable following appropriate drawing operations. The monomers required for preparing the copolyamides shall be readily accessible and the polymer solutions obtained by polycondensation shall be directly spinnable or shapable following filtration and appropriate devolatilization.

This object is achieved by novel aromatic copolyamides which consist predominantly of para-substituted aromatic chain constituents but are nonetheless readily soluble in amide solvents—in the main without additional salt—and which can be processed from these solutions into shaped structures such as filaments, fibers, fiber pulp and films. These novel copolyamides have in common the presence of alkylsulfonyl groups as solubility-increasing side groups. These novel copolyamides consist to at least 95 mol %, preferably 100 mol %, of the following recurring, exclusively para-bonded structural units:

A: —OC—Ar—CO—
B: —HN—Ar'—NH—

C: —HN—Ar"—NH—
    |
    SO$_2$R

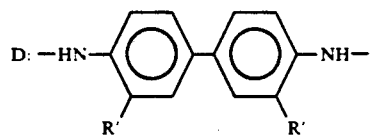
D: —HN—⟨ring⟩—⟨ring⟩—NH—
         R'        R'

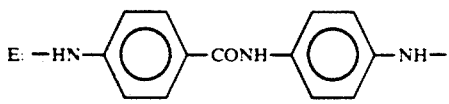

of which the structural unit A is always present as is a selection of not more than 3 of the structural units B, C, D and E, and up to 5 mol % of structural units F and/or G which contain m-bonds and are derived from aromatic dicarboxylic acids (F') and/or from aromatic diamines (G'), the sum total of the mole fractions of the structural units A+F and the sum total of the mole fractions of the structural units of B, C, D, E and G being essentially the same.

In these formulae the variables have the following meanings:

—Ar— and —Ar'— are divalent aromatic radicals whose C—N valence bonds are in a para-position or in a similar coaxial or parallel position and which may be substituted by one or two inert radicals, such as lower alkyl or halogen,

a trivalent aromatic radical which after removal of the —SO$_2$R radical has the same meaning as —Ar— or —Ar'— or else is

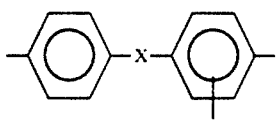

where X is —O—, —NHCO—, —SO$_2$—or —CO—,
—R is lower alkyl and
—R' is lower alkyl or alkoxy.

The lower alkyl and alkoxy radicals have carbon chains of 1 to 4 carbon atoms, which are preferably linear.

Divalent aromatic radicals —Ar— in which the valence bonds are in para or similar coaxial or parallel position are monocyclic or bicyclic fused aromatic radicals such as 1,4-phenylene, 1,4-naphthylene, 1,5-naphthylene, 2,6-naphthylene and 4,4,-biphenylene.

Divalent aromatic radicals —Ar'— in which the valence bonds are in para or similar coaxial or parallel position are monocyclic or bicyclic fused aromatic radicals such as 1,4-phenylene, 1,4-naphthylene, 1,5-naphthylene and 0 2,6-naphthylene. Preferably, —Ar— and —Ar'—are each 1,4-phenylene.

The radicals —Ar— and —Ar'— may be monosubstituted or disubstituted by lower alkyl radicals, i.e. straight-chain or branched alkyl radicals of 1 to 4 carbon atoms, or by halogen, in particular by F, Cl or Br.

Preferred alkyl substituents are straight-chain, in particular methyl or ethyl. Preferred halogen is chlorine.

The polyamides according to the present invention may contain the unsubstituted radicals —Ar— and —Ar'— and the alkyl- and/or halogen-substituted radicals —Ar— and —Ar'— side by side in varying proportions.

In effect, the polyamide may contain one or more kinds of substituted radicals —Ar— and —Ar'—; for example it may contain methyl-substituted —Ar— and-/or —Ar'— radicals only or it may contain proportions of —Ar— and/or —Ar'— radicals having different alkyl substituents and/or halogen substituents.

However, the polyamides according to the present invention may also contain unsubstituted or substituted radicals —Ar— and —Ar'— only. For cost reasons preference is given to those polyamides according to the present invention which contain only unsubstituted radicals or up to about 30 mol % of substituted radicals —Ar— and —Ar'—.

Trivalent aromatic radicals

which the C-N valence bonds are in para or similar coaxial or parallel position are monocyclic or bicyclic fused aromatic radicals such as 1,4-phenylene, 1,4-naphthylene, 1,5-naphthylene and 2,6-naphthylene in each of which the sulfoalkyl group occupies some other free position, or else systems of the structure

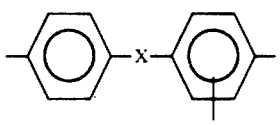

where X is —O—, —NHCO—, —SO$_2$— or —CO—. Examples of

are:

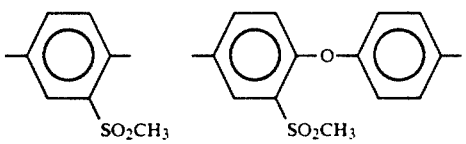

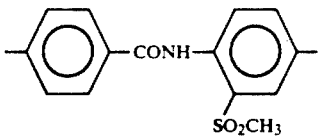

The corresponding diamines are

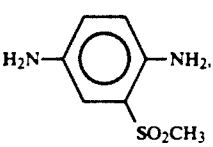

I

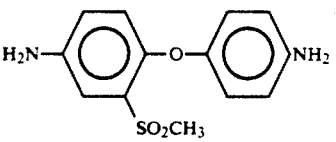

II

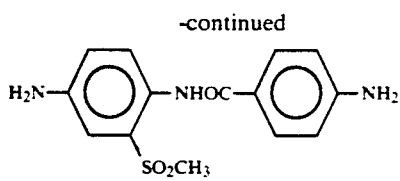

III

I can be prepared from 1-chloro-2-methylsulfonyl-4-nitrobenzene, which is reacted with aqueous NH: to give 1-amino-2-methylsulfonyl-4-nitrobenzene (cf. Dickey et al., Ind. eng. Chem. 45 (1953), 1730, 1733) and then hydrogenated to I.

II can be prepared by reacting 1-chloro-2-methanesulfonyl-4-nitrobenzene with 4-nitrophenol or 4-aminophenol and subsequent hydrogenation.

One way of preparing III is to react 1-amino-2-methyl-sulfonyl-4-nitrobenzene with 4-nitrobenzoyl chloride and subsequent hydrogenation.

Although these alkylsulfonyl groups are not part of the polymer main chain but are side chain groups, our observations show that the initial modulus of filaments decreases within a series of equal monomers with increasing alkylsulfonyl content, so that it is necessary to seek a compromise between solubility and modulus. Lower alkyl —R are straight-chain or branched and have 1–4 carbon atoms. Preferably —R is straight-chain and has in particular 1—2 carbon atoms. Particularly preferably, —R is methyl.

Particularly preferred radicals —R' are methyl and methoxy.

The copolyamides according to the present invention contain in total only 4 components, to be precise:
A+B+C+D
A+C+D+E
i.e. they contain only three amine components, specifically C and D, combined with either B or E.

The structural units B, C, D and E derived from the copolymerized diamines present in the polyamide are present in the aromatic polyamides according to the present invention only in the following specific mole percent ranges (based on the total amount of diamine components):
B: 25–47.5 mol %, preferably 25–30 mol %
C: 7.5–30 mol %, preferably 10–25" mol %
D: 45–67.5 mol %, preferably 50–65 mol %
E: 20–40 25mol %, preferably 25–37.5 mol %

Besides the structural units having para-disposed or similarly coaxial-directed or parallel-opposed bonds, the polyamides according to the present invention may contain up to 5 mol %, based on all structural units, of m-bondcontaining structural units F and G.

m-bond-containing structural units F and G for the purposes of the present invention are those which contain an aromatic nucleus whose bonds within the chain of the molecule are meta to one another. Such structural units are for example the radicals of C isophthalic acid, m-phenylenediamine, 3,4"-diaminobiphenyl or the alkyl and/or alkoxy substitution products thereof, or 3,4'- or 3',4-diaminobenzanilide.

It is self-evident to the person skilled in the art that the sum total of all structural units derived from aromatic acids (A+F) and the sum total of all structural units derived from aromatic amines B, C, D, E and G will be essentially the same, i.e. not different by more than about 1%, preferably by not more than 0.2%, being the same in particular within the limitations of practical measuring and metering.

The aromatic polyamides according to the present invention are soluble in organic aprotic polar solvents and can be processed directly from these solutions into shaped structures.

The structures obtained exhibit a combination of very good technological properties.

This combination of properties plus the ready solubility in organic solvents and the resulting economically and ecologically advantageous processing constitutes an immensely valuable enrichment of the art in the field of wholly aromatic polyamides.

The excellent technological properties of the shaped structures according to the present invention rest on the incorporation of the amine units B, C, D and E within the above-specified limits. As will be evident from the comparative experiments described hereinafter, the technological properties decrease dramatically outside the claimed monomer combinations and outside the claimed percentage proportions.

Aromatic polyaramides with one or two of the amine components B, D and E are common knowledge. For instance, it is known to use terephthalic acid and p-phenylenediamine radicals for polyamides; cf. previously cited German Patent 2,219,703. These products are virtually no longer soluble in amide solvents.

The use of benzidines and of 4,4'-diaminobenzanilide as aramide components is known.

However, the use of alkylsulfonyl-containing aromatic diamines (C,) for increasing the solubility of exclusively p-diamine-based polyaramides has hitherto not become known to us.

As is evident from the above-cited references, the polyamides in question are usually insoluble in amide solvents or else the filaments spun from organic solvents have only moderate properties.

By contrast, the polyamides of the present invention, prepared using mixtures of the amine components B+C+D or C+D+E within certain concentration ranges, are surprisingly soluble in amide solvents—usually without the addition of a salt. The filaments spun therefrom exhibit high strength and a very high initial modulus.

The aromatic polyamides according to the present invention are prepared by solution condensation of aromatic dicarbonyl dichlorides with equivalent amounts of mixtures of aromatic diamines in known polyamide solvents, i.e. in aprotic polar solvents of the amide type, for example in N,N-dimethylacetamide, tetramethylurea or in particular in N-methyl-2-pyrrolidone. Usually, an additional salt ($CaCl_2$, LiCl) is not required.

The polycondensation temperatures are customarily between $-20°$ C. and $+120°$ C., preferably between $+10°$ C. and $+100°$ C. Particularly good results are obtained with reaction temperatures between $+10°$ C. and $+80°$ C. The polycondensation reactions are preferably carried out in such a way that, after the reaction has ended, from 2 to 15, preferably from 5 to 10, % by weight of polycondensate is present in the solution. Particularly good results are obtained with concentrations of from 5.0 to 7.5% by weight.

In the course of the polycondensation the molecular weight of the polymer and hence the viscosity of the reaction batch increase. If desired, chain growth may be terminated by addition of a monofunctional acid chloride, e.g. acetyl chloride The chain length is sufficient when the viscosity of the polymer solution obtained in the course of the polycondensation corresponds to an inherent viscosity of the polymer of about 4.5 - 7.5 dl/g.

The inherent viscosity is given by the expression

$$\eta_{inh} = \frac{\ln \eta_{rel}}{c}$$

where $\eta_{rel}$ is the relative viscosity and c the concentration in g/100 ml.

For the purposes of the present invention the inherent viscosity was determined on solutions of 0.5 g of polymer in 100 ml of 98% strength by weight sulfuric acid at 25° C.

The outlined, basically known process for preparing aromatic polyamides likewise forms part of the subject-matter of the present invention insofar as it concerns the preparation of the above-described aromatic polyamides according to the present invention. This process of the present invention comprises reacting from 95 to 100 mol % of a dicarbonyl dichloride of the formula

Cl-OC-Ar-CO-Cl (A')

and from 0 to 5 mol % of an m-bond-containing dichloride of an aromatic dicarboxylic acid (F') with an equivalent amount of a diamine mixture composed of 95-100 mol % of a mixture of diamines consisting of 25-47.5 mol %, preferably 25-30 mol %, of a diamine of the formula

H$_2$N-Ar'-NH$_2$ (B')

7.5-30 mol %, preferably 10-25 mol %, of a diamine of the formula

H$_2$N—Ar''—NH$_2$ (C')
      |
      SO$_2$R 45-67.5 mol %, preferably 50-65 mol %, of a diamine of the formula (D')

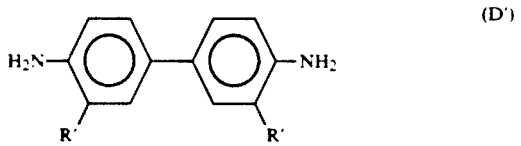

20-40 mol %, preferably 25-37.5 mol % of 4,4'-diamino-benzanilide %(E')
and of 0-5 mol % of an m-bond-containing aromatic diamine (G') in the stated manner.

m-bond-containing aromatic dicarbonyl dichlorides and aromatic diamines for the purposes of the present invention are those in which the directions of the bonds of the two carbonyl chloride groups or of the two amino groups form an angle which corresponds to that of m-bonds. Such dicarbonyl chlorides and diamines are for example isophthaloyl dichloride, m-phenylenediamine, 3,4'-diaminobiphenyl or the alkyl and/or alkoxy substitution products thereof, or 3,4'- or 3',4-diaminobenzanilide.

In this process, the resulting polyamides according to the present invention remain in solution in the solvent. Once the polymer solution has reached the viscosity required for further processing, the polycondensation can be terminated in a conventional manner by adding a monofunctional compound, e.g. acetyl chloride. The hydrogen chloride formed, which is bound loosely to the amide solvent, is then neutralized by adding a basic substance. Suitable for this purpose are for example lithium hydroxide and calcium hydroxide but in particular calcium oxide.

To produce shaped structures from the polyamides according to the present invention the resulting neutralized solutions of the polyamides according to the present invention are filtered, devolatilized and processed in a conventional manner into filaments, fibers, fiber pulp, films or sheets, each of which likewise forms part of the subject-matter of the present invention. This may be done for example by using a wet spinning machine, where the polymer solution is extruded through suitable dies into a coagulating bath and the filaments obtained are pulled through wash baths and drawn at elevated temperature. Suitable coagulating baths are the aqueous solutions of the same amide solvent also used for preparing the polymer. However, it is also possible to use aqueous salt solutions such as, for example, calcium chloride solutions.

In the course of the extruding of the polymer solutions and the takeoff of the shaped structures such as filaments or sheets from the coagulating bath, these structures undergo only a relatively small wet stretch. The structures emerging from the coagulating baths and washed and dried in a conventional manner must therefore be subjected to a further stretching or drawing operation in order to confer the desired mechanical properties, such as a high modulus of elasticity and a high tensile strength, on them.

In the production of the filaments, fibers and films according to the present invention, the total draw ratio is accordingly the product of a wet stretch to a small stretch ratio and a subsequent drawing operation to a higher draw ratio. The latter operation is in general carried out in a conventional manner at elevated temperature on drawing units within which a single- or multistage drawing operation takes place between godet rolls revolving at different circumferential speeds.

To heat the filaments to the required drawing temperature, it is possible to carry out a contact drawing operation in which the filaments are drawn over hot plates mounted within the drawing zone of the drawing unit, which have surface temperatures of from 280° C to 470° C, preferably from 360° C to 150° C. In the course of this filaments are drawn to a draw ratio within the range from 2.5:1 to about 12:1, preferably from 4:1 to 12:1.

A similarly suitable variant of the spinning process is the dry jet wet spinning process as described for example in U.S. Pat. No. 34 14 645. In said process, the direction of spinning is downward and the filaments, after emerging from the jet, pass first through a gaseous medium, preferably air, and then enter an aqueous coagulation bath. The subsequent treatment of the filaments thus produced is as described above.

The shaped articles produced from the raw materials according to the present invention, for example fibers, filaments, fiber pulp or films, are used for example as reinforcing elements for plastics or as industrial materials for filtration and insulation. If insulation is required, it is also possible to apply a polymer solution to the structure to be insulated in the form of a film and then to remove the solvent and any solubilizer present.

The Examples which follow further illustrate the invention. The proportions of dicarboxylic acid components and diamine components were each set at 100 mol %.

EXAMPLE 1

Aromatic copolyamide from 100 mol % of terephthaloyl chloride, 65 mol % of dimethylbenzidine, 25 mol % of p-phenylenediamine and 10 mol % of 1,4-diamino-2-methylsulfonylbenzene. 93.84 g (0.442 mol) of 3,3,-dimethylbenzidine, 18.36 g (0.17 mol) of p-phenylenediamine and 12.67 g (0.068 mol) of 1,4-diamino-2-methylsulfonylbenzene are dissolved under nitrogen in 3974 g of anhydrous N-methylpyrrolidone, and the solution is cooled down to 14° C. It is reacted with 139.4 g of pulverized terephthaloyl chloride (0.687 mol) while the temperature is allowed to rise to 70° C. The desired viscosity is reached after 40 minutes. The solution is neutralized with 62.9 g of a 65 percent strength suspension of calcium oxide (96 percent purity) in N-methylpyrrolidone.

The solution contains 5% by weight of copolyamide and 1.9% by weight of calcium chloride. The inherent viscosity of the dissolved polyamide is 6.57 dl/g.

The solution is filtered, devolatilized and wet-spun. To this end it is forced at a temperature of 100° C through a die plate, disposed horizontally in the coagulating bath, having 100 holes each 0.15 mm in diameter, into the coagulation bath, and the filaments are taken off at 16 m/min. The coagulation bath is a 35 percent strength aqueous solution of N-methylpyrrolidone at a temperature of 60° C.

The filaments obtained are passed through a waterbath and a multistage washer, over 3 drying godets at 120, 160 and 240° C. and finally over a four-part hot plate having surface temperatures of 350, 370 and 390° C. at a speed of 69 m/min. This speed, as in the following operative and comparative examples, was determined in such a way as to subject the filaments to a draw ratio of 80% of the maximum draw ratio. Thereafter the multifilament yarn of this Example and the following Examples was given a protective twist corresponding to $a_m=30$ (DIN 53 832 Part 1) and then tested. In Example 1, the filament denier was 1.76 dtex (DIN 53 830) and the tenacity was 163 cN/tex with an elongation at break of 2.0% (DIN 53 834 Part 1).

The initial modulus is 89 N/tex. It is determined from the gradient of the stress-strain diagram between 0.3 and 0.5% extension.

EXAMPLES 2 TO 9

Example 1 was repeated under the reaction conditions specified in Table 1 and using the starting materials specified therein to prepare further aromatic polyamides according to the present invention.

The polyamides thus obtained, which differ in composition in respect of the diamine structural units B, C, D and E, can subsequently be spun directly from the reaction solution and drawn as described in Example 1.

The spinning and drawing conditions and the properties of the filaments thus obtained are likewise shown in Table 1.

The key to the abbreviations used in Table 1 is as follows: TPC = terephthaloyl chloride; PPD = p-phenylene 25 diamine; DMB 3,3,-dimethylbenzidine; DMOB 3,3'dimethoxybenzidine; DABA = 4,4'-diaminobenzanilide; NMP = N-methylpyrrolidone.

The sulfomethyldiamines I-III were described above. I is 1,4-diamino-2-methylsulfonylbenzene, II is 4,4'-diamino2-methylsulfonyldiphenyl ether, and III is the 4-amino2-methylsulfonylanilide of 4-aminobenzoic acid.

TABLE 1

| Polymer type | A + B + C + D | | | | A + C + D + E | | |
|---|---|---|---|---|---|---|---|
| Example | 2 | 3 | 4 | 5 | 6 | 7 | 8 |
| Polymer | | | | | | | |
| Sulfone Type | I | I | II | III | I | I | I |
| Mol | 0.1 | 0.6 | 0.068 | 0.152 | 0.076 | 0.095 | 0.20 |
| Mol-% | 12.5 | 25 | 10 | 20 | 10 | 12.5 | 25 |
| g | 18.6 | 111.7 | 18.9 | 46.4 | 14.15 | 17.7 | 37.2 |
| PPD Mol | 0.22 | 0.6 | 0.17 | 0.228 | | | |
| Mol-% | 27.5 | 25 | 25 | 30 | | | |
| g | 23.8 | 64.9 | 18.4 | 24.6 | | | |
| DMB Mol | 0.48 | 1.2 | 0.442 | | 0.456 | 0.38 | 0.4 |
| Mol-% | 60 | 50 | 65 | | 60 | 50 | 50 |
| g | 101.9 | 254.8 | 93.8 | | 96.8 | 80.7 | 84.9 |
| DMOB Mol | | | | 0.38 | | | |
| Mol-% | | | | 50 | | | |
| g | | | | 92.8 | | | |
| DABA Mol | | | | | 0.228 | 0.285 | 0.2 |
| Mol-% | | | | | 30 | 37.5 | 25 |
| g | | | | | 51.8 | 64.8 | 45.45 |
| CaCl$_2$ g | | | 21.9 | 26.2 | | | |
| NMP g | 3800 | 13851 | 4069 | 4503 | 4011 | 4017 | 4165 |
| TPC g | 162.4 | 484.7 | 138.0 | 154.3 | 154.3 | 154.3 | 162.4 |
| Acetyl chloride g | | 3.8 | | | | | |
| Reaction time/min | 35 | 55 | 25 | 18 | 40 | 35 | 42 |
| Reaction temp. °C. | 13.3-66 | 30.5-56.4 | 15-62 | 12-54 | 13-65 | 13-61 | 12.8-59 |
| CaO[1] g | 74.0 | 222 | 62.9 | 70.3 | 70.3 | 70.3 | 74.0 |
| Polymer conc. % | 6 | 5 | 5 | 5.38 | 6 | 6 | 6 |
| Salt conc. % | 2.15 | 1.79 | 2.22 | 2.27 | 1.94 | 1.93 | 1.94 |
| Polymer viscosity$_{inh}$ | 5.42 | 6.51 | 5.62 | 5.87 | 6.26 | 5.76 | 4.83 |
| Spinning and drawing | | | | | | | |
| Process | TN | TN | N | TN | N | TN | N |
| Temp. of spinning solution °C. | 100 | 100 | 100 | 100 | 100 | 100 | 95 |
| Number of jets holes | 100 | 100 | 100 | 100 | 100 | 100 | 100 |
| Jet hole diameter mm | 0.15 | 0.15 | 0.15 | 0.15 | 0.15 | 0.15 | 0.15 |
| Distance jet/coagulation bath mm | 40 | 40 | / | 40 | / | 40 | / |
| Coagulation bath composition: | 35 | 35 | 35 | 35 | 35 | 35 | 35 |

TABLE 1-continued

| Polymer type | A + B + C + D | | | | A + C + D + E | | |
|---|---|---|---|---|---|---|---|
| Example | 2 | 3 | 4 | 5 | 6 | 7 | 8 |
| % NMP | | | | | | | |
| Coagulation bath temperature °C. | 80 | 80 | 80 | 80 | 80 | 60 | 80 |
| Takeoff speed m/min | 16 | 16 | 16 | 16 | 16 | 16 | 16 |
| Dry godet temperature °C. | 120 | 120 | 120 | 120 | 120 | 120 | 120 |
| | 240 | 240 | 140 | 160 | 160 | 160 | 160 |
| | | | 160 | 240 | 240 | 240 | 240 |
| Hotplate temperature °C. | 360–400 | 330–370 | 350–390 | 380–410 | 360–390 | 400–420 | 340–380 |
| Takeoff speed m/min | 170.4 | 120.6 | 70.2 | 156.2 | 80.3 | 133.0 | 86.3 |
| Filament properties | | | | | | | |
| Filament denier dtex | 2.00 | 1.82 | 1.79 | 1.24 | 1.93 | 2.29 | 1.85 |
| Tenacity cN/tex | 136 | 163 | 159 | 125 | 153 | 155 | 129 |
| Elongation at break % | 1.9 | 2.7 | 2.6 | 2.6 | 2.0 | 2.1 | 1.9 |
| Initial modulus N/tex | 85 | 79 | 71 | 65 | 83 | 81 | 76 |

W = wet spinning.
DW = dry-wet spinning
[1] 65 percent strength suspension of 96 percent pure CaO in NMP

COMPARATIVE EXAMPLES 1 AND 2

The following comparative experiments show that compositions which do not conform to the claims deteriorate greatly in their properties and/or are unusable. This is true of the combination A+B+C+E (Comparative Example 1), where insolubility is incurred soon, and also of a composition involving four diamine components (A+B+C+D+E-Comparative Example 2).

The abbreviations used in Table 2 have the same meaning as in Table 1.

TABLE 2

| Polymer type | A + B + C + E | A + B + C + D + E |
|---|---|---|
| Comparative Example | 1 | 2 |
| Polymer | | |
| Sulfone Type | 1 | 1 |
| mol | 0.9 | 0.48 |
| mol % | 37.5 | 20 |
| g | 167.6 | 89.4 |
| PPD mol | 0.6 | 0.48 |
| mol % | 25 | 20 |
| g | 64.9 | 51.9 |
| DMB mol | | 0.72 |
| mol % | | 30 |
| g | | 152.85 |
| DABA mol | 0.9 | 0.72 |
| mol % | 37.5 | 30 |
| g | 204.5 | 163.6 |
| CaCl$_2$ g | 74.9 | / |
| NMP g | 17630 | 14348 |
| TPC g | 488.3 | 485.8 |
| Acetyl chloride g | 3.8 | 3.8 |
| Reaction time/min | 60 | 26 |
| Reaction temperature °C. | 30–55.8 | 30.6–54.1 |
| CaO[1] | 222 | 222 |
| Polymer con % | 4 | 5 |
| Salt conc. % | 1.82 | 1.73 |
| Polymer visc.$_{inh}$ | 5.10 | 5.37 |
| Spinning and drawing | | |
| Process | TN | N |
| Temperature of spinning solution in °C. | 100 | 123 |
| Number of jet holes | Yarn extremely | 100 |
| Jet hole diameter mm | brittle. | 0.10 |
| Distance jet/coagulation bath mm | Virtually undrawable. | / |
| Coagulation bath composition; % NMP | Unusable. | 35 |
| Coagulation bath temperature °C. | | 80 |
| Takeoff speed m/min | | 16 |
| Dry godet temperature °C. | | 120 |
| | | 240 |
| Hotplate temperature °C. | | 410–450 |
| Takeoff speed m/min | | 41.5 |
| Filament properties | | |
| Filament denier dtex | | 0.83 |
| Tenacity cN/tex | | 95 |
| Elongation at break % | | 1.5 |

TABLE 2-continued

| Polymer type | A + B + C + E | A + B + C + D + E |
|---|---|---|
| Comparative Example | 1 | 2 |
| Initial modulus N/tex | | 75 |

[1] 65 percent strength suspension of 96 percent pure CaO in NMP

We claim:

1. An aromatic copolyamide which is soluble in an organic amide solvent, comprising A+B+C+D, or A+C+D+E in at least 95 mol % of recurring structural units:

A: —OC—Ar—CO—
B: —NH—Ar'—NH—

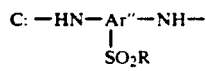

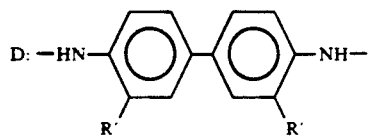

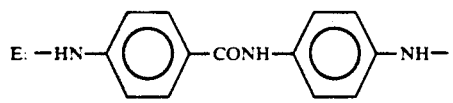

and p to 5 mol % of m-bond-comprising structural units F or G or a mixture thereof derived from aromatic dicarboxylic acids (F') or from aromatic diamines (G') or a mixture thereof, the sum total of the mole fractions of the structural units A+F and the sum total of the mole fractions of the structural units of B+C+D+E+G being essentially the same, —Ar— and —Ar'— are divalent aromatic radicals having C—N valence bonds in a para-position or in a similar coaxial or parallel position and which are unsubstituted or are substituted by one or two inert radicals, such as lower alkyl or halogen, —Ar''— is a trivalent aromatic radical whose C—N valence bonds are in a para-position or in a similar coaxial or parallel position and which are unsubstituted or are substituted by one or two inert radicals, lower alkyl or halogen, or else is the structural unit

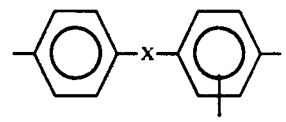

where X is —O—, —NHCO—, SO₂—or —CO—,
—R is lower alkyl and
—R' is lower alkyl or alkoxy,
and the proportions of the diamine components, B, C, D and E are within the following limits:
B: 25–47.5 mol %
C: 7.5–30 mol %
D: 45–67.5 mol %
E: 20–40 mol %

2. A copolyamide as claimed in claim 1, wherein the proportions of the diamine components B, C, D and E are within the following limits:
B=25–30 mol %
C=10–25 mol %
D=50–65 mol %
E=25–37.5 mol % , 3. A copolyamide as claimed in claim 1,
wherein —Ar— is 1,4-phenylene, 1,4—, 1,5— or 2,6-naphthylene or 4,4'-biphenylene and —Ar'— is 1,4-phenylene, or 1,4', 1,5— or 2,6-naphthylene, and -Ar'- is 1,4-phenylene, 1,4—, 1,5— or 2,6-naphthylene or the radical

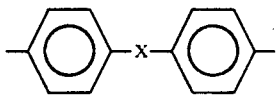

where X is —O—, —NHCO—, —SO₂— or —CO— and the alkylsulfonyl group occupies any desired free position.

4. A copolyamide as claimed in claim 1 wherein R is straight-chain alkyl of 1 to 4 carbon atoms.

5. A copolyamide as claimed in claim 4, wherein R is methyl.

6. A copolyamide as claimed in claim 1, wherein R' is straight-chain alkyl of 1 to 4 carbon atoms, or straight-chain alkoxy of 1 to 4 carbon atoms.

7. A copolyamide as claimed in claim 6, wherein R' is methyl or methoxy.

8. A copolyamide as claimed in claim 1,
wherein the m-bond-containing structural units F and G are divalent radicals of isophthalic acid, m-phenylenediamine, 3,4'- or 4,3'-diaminobenzanilide or 3,4,-diaminodiphenyl ether.

9. A process for preparing the aromatic copolyamide of claim 1 by polycondensation of a dicarbonyl chloride with an aromatic diamine in a known polyamide solvent at elevated temperature in the presence or absence of an alkali metal or alkaline earth metal halide, which comprises reacting from 95 to 100 mol % of a dicarbonyl dichloride of the formula Cl-OC-Ar-CO-Cl             (A')

and from 0 to 5 mol % of an m-bond-containing dichloride of an aromatic dicarboxylic acid (F') with an equivalent amount of a diamine mixture composed of 95–100 mol % of a mixture of diamines consisting of 25–47.5 mol % of a diamine of the formula H₂N—Ar'—NH₂              (B')

7.5–30 mol % of a diamine of the formula

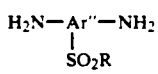

45–67.5 mol % of a diamine of the formula

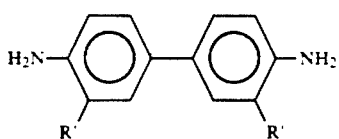 (D')

20–40 mol % of 4,4'-diamino-benzanilide (E') and of 0–5 mol % of an m-bond-containing aromatic diamine (G')

10. The process of claim 9, wherein the mixture of diamines with which the dicarbonyl dichloride is reacted consists of
25–30 mol % of B'
10–25 mol % of C'
50–65 mol % of D' and
23–37.5 ,p; % pf E'.

11. A shaped structure aromatic copolyamide of claim 1.

12. A shaped structure as claimed in claim 11, wherein said structure is filament, a fiber, a fiber pulp, a film or a membrane formed from an aromatic copolyamide of the dicarboxylic acid/diamine type.

* * * * *